Jan. 7, 1930.  E. FREIVOGEL  1,742,590
AUTOMOBILE TIRE REMOVER
Filed Aug. 26, 1927   2 Sheets-Sheet 1
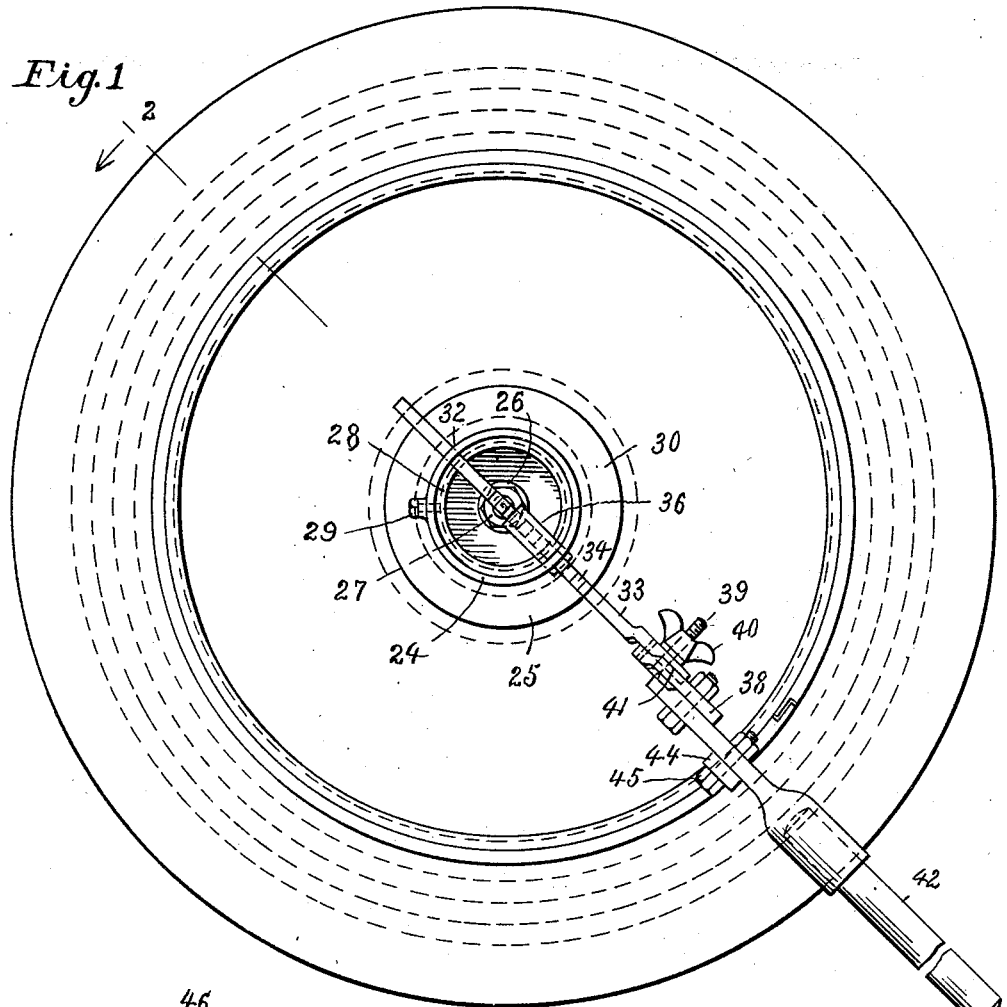
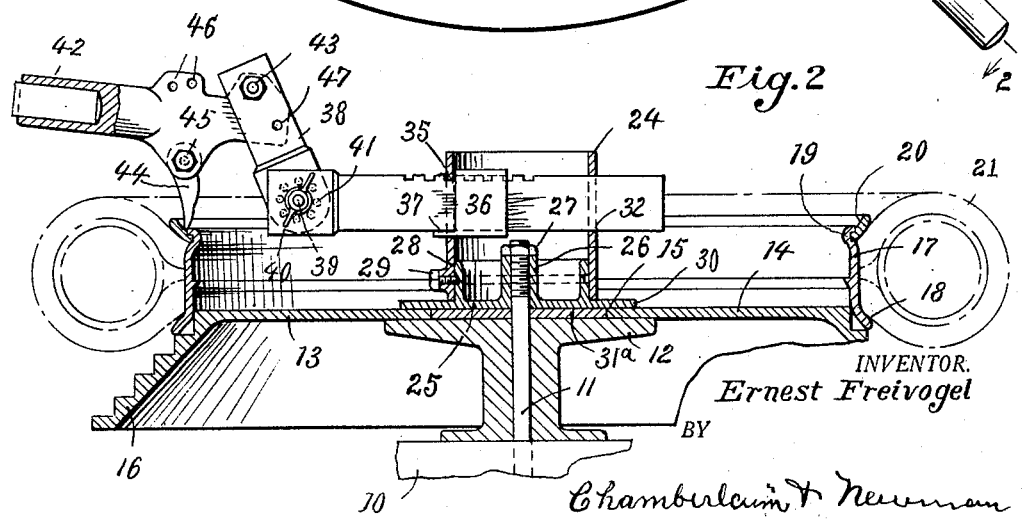
INVENTOR.
Ernest Freivogel
BY
Chamberlain + Newman

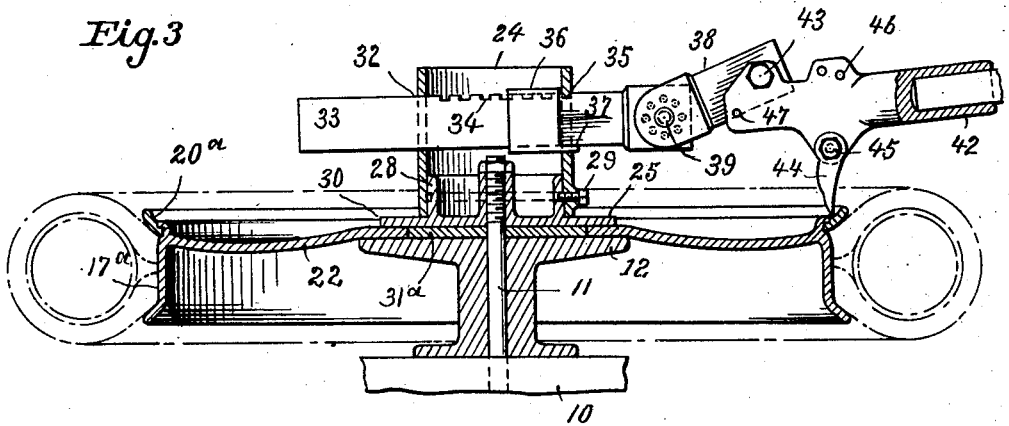
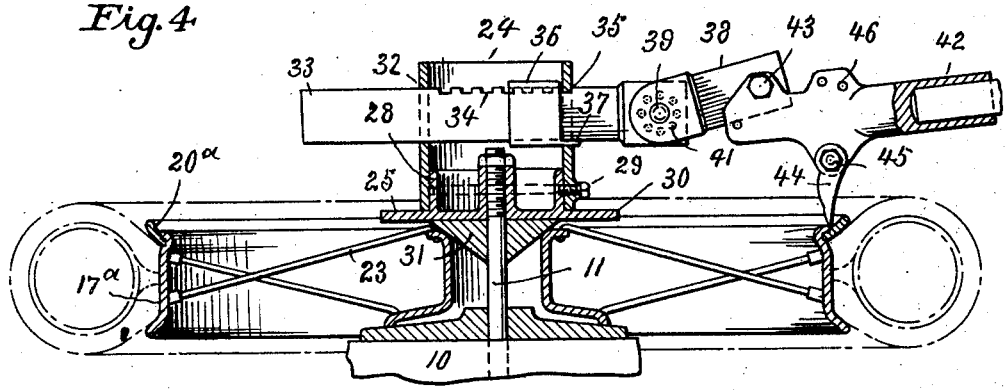
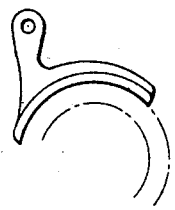

Patented Jan. 7, 1930

1,742,590

UNITED STATES PATENT OFFICE

ERNEST FREIVOGEL, OF RIDGEFIELD, CONNECTICUT, ASSIGNOR OF ONE-HALF TO RICHARD A. JACKSON, OF RIDGEFIELD, CONNECTICUT

AUTOMOBILE TIRE REMOVER

Application filed August 26, 1927. Serial No. 215,597.

My invention relates to new and useful improvements in automobile tire removers and is adapted for removing tires from disc wheels, wire wheels and wheel rims of various types and sizes, and is more particularly an improvement upon that type of tire remover shown and described in my prior Patent Number 1,716,882, June 11, 1929.

An object of the invention is to provide a simple form of tire remover, including an annular support upon which a wheel or rim may be positioned preparatory to the removal of a tire therefrom, and having an upwardly extended tubular column in which is adjustably mounted an arm adapted to carry different forms of tools for engagement with a wheel rim or tire.

A further object is to provide in a device of the character stated, an adjustable link connection for the support of a lever upon and with respect to the arm adjustably mounted in the tubular post.

An additional object is to so design and construct the tire remover that when built along the lines suggested the same can be quickly and efficiently operated for the quick removal of a tire, even though the same has become stuck to the rim and difficult to remove by the usual hand tool manipulation.

With these and other objects in view, the invention resides and consists in the construction and novel combination and arrangement of members hereinafter more fully described, illustrated in the accompanying drawings and pointed out in the claims hereto appended, it being understood that various changes in form, proportion, size and minor details of construction within the scope of the claims may be resorted to without departing from the spirit or sacrificing any of the advantages of the invention.

Similar characters of reference denote like or corresponding parts throughout the several figures of the accompanying drawings forming a part of this specification, and in which Fig. 1 is a plan view of my improved tire remover, together with a wheel rim and tire mounted thereon as in position for the removing of the tire therefrom;

Fig. 2 is a vertical sectional view along the line 2—2 of Fig. 1 and showing the remover, rim and tire;

Fig. 3 is a similar vertical cross-section showing the application of the invention to the removal of a ring and tire as mounted upon a disc wheel;

Fig. 4 shows a further central vertical sectional view of my improved tire remover, the same adapted and applied in the removal of a ring and tire from a wire wheel; and Fig. 5 is a detailed side elevational view showing a tire removing tool adapted to be substituted for the chisel-like tool shown in the other figures.

The essential features of the several forms of the invention as shown herein are substantially alike, the differences being principally in the required forms of means for supporting the different sizes of wheels or tires, the operating lever, supporting arm and central tubular support being practically alike in all instances.

Referring in detail to the characters of reference marked upon the drawing, 10 represents a base member of any suitable character and in which is supported a post 11. Mounted upon the base 10, and provided with a central hole through which the post 11 extends, is a flanged support 12. The upper flanged portion of this support serves as a table or rest upon which the hub portion of a wheel may be seated or upon which the table top 13, as shown in Fig. 2, may be similarly supported. This table top, as will be seen from Figs. 1 and 2, may be formed of either cast or sheet metal, and is of a disc-like structure, including a web 14 having a central hole 15 therein, and an outer depending annular flange 16 including a series of annular shoulders of different diameters to receive and support tire rims 17 of different sizes in the manner shown in Fig. 2. Such a tire rim is indicative of the commercial type of rim and comprises an annular sheet metal rim having the usual annular flanged edge 18 and the grooved edge portion 19 in which a removable ring 20 is supported to engage and to hold the tire 21 in position thereon. The disc-like wheel 22 shown in Fig. 3 and the wire wheel 23 shown in Fig. 4 include substantially the same form of rim 17ª and ring 20ª as that shown in Fig. 2, though as will be seen, it is formed as a part of the wheel.

My invention further includes a tubular column 24 which is secured to and supported on a flanged plate 25 having a hub portion 26 to receive the threaded end of the post 11 and against which a nut 27 threadedly attached to the said post is clamped. Plate 25 further includes an outwardly disposed annular flange 28 upon which the tubular column is supported and to which it is secured as by means of a screw 29. The annular base portion 30 of this plate extends out sufficiently far to engage the table top 13, as in Fig. 2, or the inner web portion of the disc wheel shown in Fig. 3. When used for clamping a wire wheel, as shown in Fig. 4, I prefer to employ in connection therewith a conical shaped hub centering disc 31 which may be formed separate from or integral with the plate. Beneath this plate, when the same is used as shown in Figs. 2 and 3, I employ a washer 31ª within the central hole formed in the wheel flange and in the table top, said washer being secured in position together with the said wheel flange and table top between the plate and flanged support.

The tubular column 24 before mentioned is provided with aligned openings 32 in opposite sides to receive and support an adjustable arm 33 which is disposed crosswise and through the center of the column and adapted to be moved therein in longitudinal adjustment. Along its upper edge portion this arm is provided with a series of notches 34 to engage with the upper edge portion 35 of the tubular column in a manner to hold the arm against longitudinal movement. A sleeve 36 is slidably mounted upon the arm within the column and is provided with a finger 37 on its under side of proper thickness and width to be passed beneath the under edge portion of the arm and into one of the slots 32 in the column. With the finger 37 so positioned, the arm 33 will be retained in an elevated or raised position with a selected one of its notches 34 held in engagement with the edge 35 of the column, as shown in Fig. 2. It will be apparent from the foregoing that if it is desired to adjust the arm 33 longitudinally through the column it will be necessary for the operator to first move back the sleeve 36 so as to bring its finger 37 out of the lower portion of the slot 32 in the column 24, thereby causing that portion of the arm to drop and its notches to disengage from the column, whereupon the arm can be adjusted, and if desired, its notches again engaged and the arm supported by the re-fastening of the sleeve.

An adjustable link or extension 38 is hingedly connected to the outer end portion of arm 33, and is provided with a screw 39 and a wing nut 40 for clamping the connected ends together. In this connection, I also provide a suitable serrated surface 41 as between the engaging faces of the arm and extension.

42 represents an operating lever which is pivotally connected as at 43 to the outer end portion of the extension 38. A chisel-like tool 44 is pivoted as at 45, to the lever 42 and serves to disengage the ring from the rim or wheel so as to make it possible to remove the tire with other tools, one of which is shown in Fig. 5, for the complete removal of the tire from the rim.

Lever 42 is provided with additional openings 46 for the connection of different kinds of tools and for different operations. Also, an opening 47 is provided whereby the lever may be adjustably connected with the link 38.

Having thus described my invention, what I claim is:

1. In combination with a tire support, means for removing a tire from a rim, said means including an arm adjustable in the direction of the diameter of the tire, a link pivotally connected to said arm, means for securing said link in various adjusted positions relative to the arm, and a tool carrying lever pivoted to said link.

2. A tire support and remover, comprising a base, a post carried by said base, a support on said post, means for clamping a rim supporting means to said support, a tubular support carried by said means and having slots in its diametrically opposite walls, an arm longitudinally adjustable through said slots and having notches in its upper edge to be selectively engaged with the wall of said tubular support, a sleeve slidably mounted on said arm and having a finger adapted to be disposed in one of said slots and beneath said arm to maintain the selected notch engaged with the wall, and a tool carrying lever pivotally mounted by said arm.

3. A tire support and remover, comprising a base, a post carried by said base, a support on said post, means for clamping a wheel or rim support to said support, said means including a flanged member and a nut threaded on said post to clamp said member in place, a tubular post secured to an upstanding annular flange on said member and having slots in its diametrically opposite walls, an arm longitudinally adjustable through said slots and having notches in its upper edge to be selectively engaged with the wall of said tubular support, a sleeve slidably mounted on said arm and having a finger adapted to be disposed in one of said slots and beneath said arm to maintain the selected notch engaged with the wall, and a tool carrying lever pivotally mounted by said arm.

4. A tire support and remover, comprising a base, a post carried by said base, a support on said post, means for clamping a wheel or rim support to said support, said means including a flanged member and a nut threaded on said post to clamp said member in place, a tubular post secured to an upstanding annular flange on said member so as to be rotatable relative to said flange, and having slots in its diametrically opposite walls, an arm longitudinally adjustable through said slots and having notches in its upper edge to be selectively engaged with the wall of said tubular support, a sleeve slidably mounted on said arm and having a finger adapted to be disposed in one of said slots and beneath said arm to maintain the selected notch engaged with the wall, and a tool carrying lever pivotally mounted by said arm.

Signed at Bridgeport, in the county of Fairfield and State of Connecticut this 25th day of August, A. D. 1927.

ERNEST FREIVOGEL.